United States Patent [19]

Carew

[11] 4,023,695
[45] May 17, 1977

[54] MOBILE STACKER WITH A WORK STATION THEREON

[76] Inventor: Victor E. Carew, 610 W. Taylor Run Parkway, Alexandria, Va. 22314

[22] Filed: June 20, 1975

[21] Appl. No.: 588,911

Related U.S. Application Data

[60] Division of Ser. No. 497,012, Aug. 13, 1974, Pat. No. 3,922,941, which is a continuation-in-part of Ser. No. 364,388, May 29, 1973, abandoned.

[52] U.S. Cl. .......................... 214/674; 214/16.4 A; 212/18; 212/125
[51] Int. Cl.² ...................................... B65G 47/00
[58] Field of Search ................ 214/16.4 R, 16.4 A, 214/16.4 B, 16 B, 660, 670–674, 730–731, 654, 75 O, 75 R, 75 G, 75 H; 212/123–126, 10, 18; 187/9 R; 296/28 R

[56] References Cited

UNITED STATES PATENTS

| | | | |
|---|---|---|---|
| 1,584,569 | 5/1926 | Cochran | 214/654 |
| 2,765,928 | 10/1956 | Riemenschneider | 212/18 X |
| 3,495,725 | 2/1970 | Tyndall et al. | 214/75 G |
| 3,724,699 | 4/1973 | Weston | 214/16.4 A |
| 3,734,329 | 5/1973 | Grelck | 214/750 |
| 3,741,419 | 6/1973 | Bergerhoff et al. | 214/730 |
| 3,747,790 | 7/1973 | Smith | 214/730 |

FOREIGN PATENTS OR APPLICATIONS

| | | | |
|---|---|---|---|
| 1,229,454 | 11/1966 | Germany | 214/730 |
| 703,068 | 4/1966 | Italy | 214/16.4 A |
| 1,207,146 | 9/1970 | United Kingdom | 214/16.4 A |
| 1,181,476 | 2/1970 | United Kingdom | 214/16.4 A |
| 1,059,096 | 2/1967 | United Kingdom | 214/16.4 A |

*Primary Examiner*—Albert J. Makay
*Assistant Examiner*—R. B. Johnson
*Attorney, Agent, or Firm*—R. Sciascia; R. Beers; S. Sheinbein

[57] ABSTRACT

A warehouse system and method for stacking, storing and retrieving material includes a cab stacker, preferably a twin-cab stacker, that can be mounted on the mast of a stacker crane or sideloader. The twin cab functions as a mobile work-station which can retrieve materials from a storage area, cut them to order, bundle them, and place them directly on a conveyor system for packing and ultimate shipment. The twin cab includes a plurality of forks mounted on a carriage which is connected to a telescoping mast on the cab. The forks can be employed as a lift or support for materials removed from cantilever or pigeon-hole racks. Automatic stops align the cab with a selected rack. The cab also may support a ledge-fence on which elongated materials can be placed for cutting by a swing-arm mounted, cutting wheel which is controlled by an automatic feed mechanism. Tape dispensers in the cab provide tape for bundling the cut materials. Sheet and elongated materials are transferred directly from the forks to conveyors. A vacuum transfer machine is employed in packing the sheet materials.

3 Claims, 8 Drawing Figures

MOBILE STACKER WITH A WORK STATION THEREON

CROSS REFERENCE TO RELATED APPLICATIONS

The present application is a division of U.S. patent application Ser. No. 497,012, filed Aug. 13, 1974 now U.S. Pat. No. 3,922,941, which in turn is a continuation-in-part of Ser. No. 364,388, filed May 29, 1973 and now abandoned.

BACKGROUND OF THE INVENTION

The present invention relates generally to warehouse systems and more particularly to a warehouse system employing a cab-stacker device capable of handling unit loads of elongated and sheet materials and acting as a mobile work-station. In its capacity as a mobile work-station the stacker is capable of stock-picking individual pieces of elongated material from pigeon-hole or cantilever storage racks and subsequently processing such material on the mobile work-station through a light-duty, cut-off operation when required and other operations such as tagging, identifying, bundling and issuing material to interfacing work stations or conveyances.

Various types of devices are in wide use today that are associated with the attainment of the functions described above. One such device employs a stacker crane with a single cab for a one-man operation. The stacker crane can use different lengths of forks or sliding forks handling unit loads, sheet materials and elongated materials. This approach requires the use of pans to hold elongated materials which are stored in cantilever racks. Warehouse methods employed in the past have not used this type of stacker with relatively cheap pigeon-hole racks, which are desirable for storage of slow-moving, light-weight elongated materials.

Sideloader fork-trucks have also been employed in the past. The trucks are guided through narrow aisles by employing guide rails. As in the case of the single-cab, stacker crane, the standard sideloader fork-truck requires pans for handling and storage of certain elongated materials. Furthermore, sideloaders cannot accommodate the use of pigeon-hole racks. Additionally, since the operator of the sideloader usually remains at floor level as the forks are raised and lowered on the hoist column, the operator's visibility has limitations, since unlike the stacker-crane operator his lift forks do not remain at or near operator eye level. This fact creates difficulty in aligning the forks on the vehicle with the arms on the cantilever racks, a problem which becomes more acute as lift heights increase and limits the height to which sideloader fork-trucks can effectively operate. Sideloaders employed in the past are not capable of using pigeon-hole racks, since their forks are aligned with the central axis of the pigeon-hole racks rather than being perpendicular thereto. In addition, both of the above systems are employed simply to move the material from the racks to separate work areas in the warehouse where cutting, identifying, bundling and issuing material to interfacing work stations or conveyances take place.

SUMMARY OF THE INVENTION

The present invention overcomes the above disadvantages by employing a warehouse system which includes a cab-stacker, preferably a twin-cab stacker, that functions as a mobile work station. The stacker can accommodate pigeon-hole racks as well as cantilever racks by its ability to rotate 360° in the horizontal plane. Since men travel in the stacker, aligning the forks with adjacent racks is no problem. The stacker can handle all types of items. The cab can be mounted on an overhead, stacker-crane, hoist column or placed on the hoist columns of a sideloader. The cab acts as a mobile workstation negating any need for carrying individual pieces or unit loads of materials back and forth between storage racks and stationary work stations except when heavy-duty cutting is required at a floor-mounted cutting machine. Conveyances and transfer devices in the warehouse provide a semi-automatic delivery system. By converting the stacker into a mobile work-station and employing it with the semi-automatic delivery system, unexpectedly large savings of time and manpower result.

The device has unique features which include a ledge-fence which provides a ledge for holding materials on which the man in the cab can work, a winch for lifting heavy materials, a working pocket for containing materials on the forks and a cutting wheel to cut materials to desired lengths.

An object of the present invention is to provide a system of cutting, bundling and tagging material immediately after it is withdrawn from a storage rack.

Another object is to increase the efficiency of a warehouse system by providing for direct transfer from the forks of a stacker to a conveyor system.

A further object of the invention is to provide mobility for a work station.

A still further object is to provide a system that can be used with both pigeon-hole and cantilever racks.

Other objects, advantages and novel features of the present invention will become apparent from the following detailed description of the invention when considered in conjunction with the accompanying drawings.

DESCRIPTION OF THE PREFERRED EMBODIMENTS

The invention will be described with respect to a twin-cab stacker.

Figure 1:
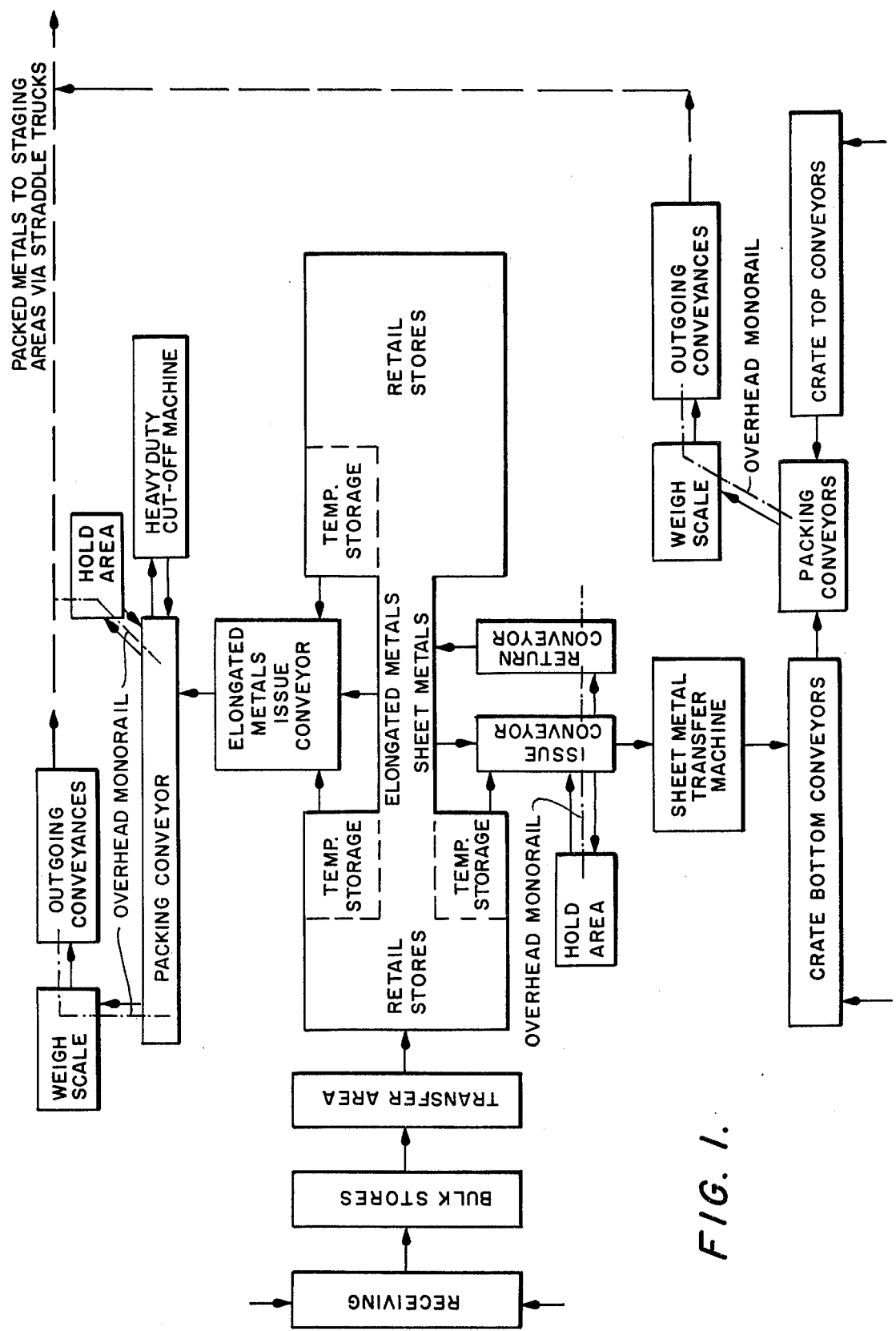
FIG. 1 is a schematic in block-diagram form of a warehouse employing the present invention.
Figure 2:
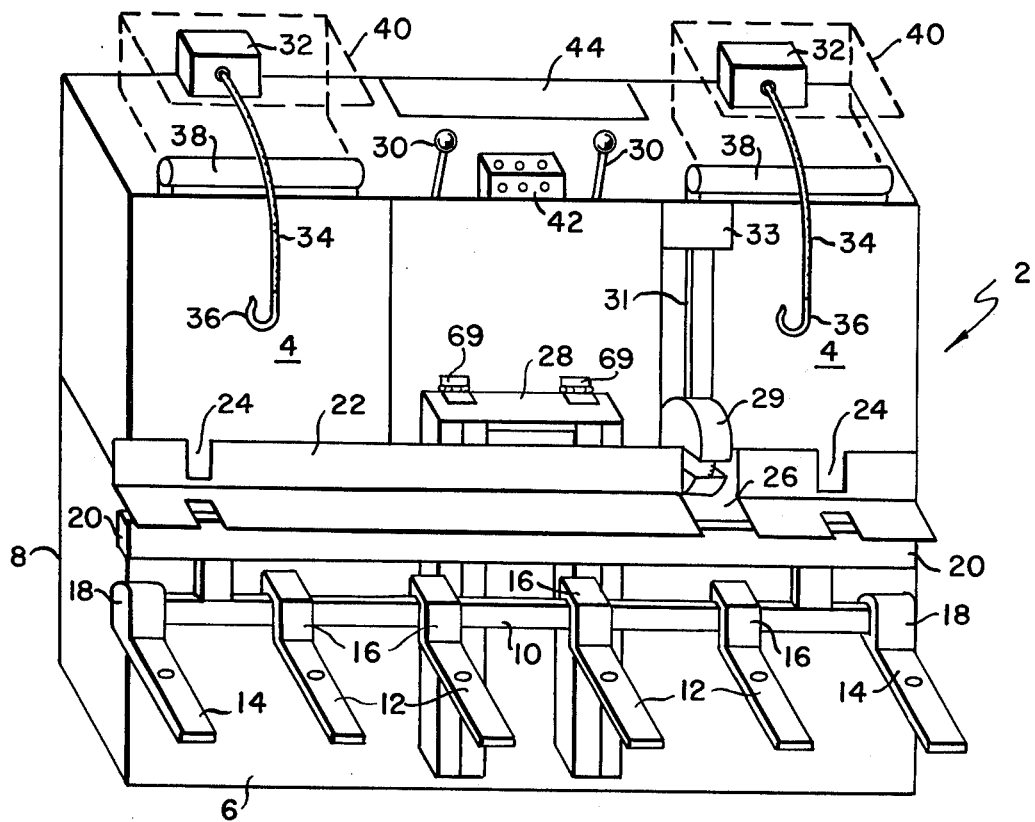
FIG. 2 is a view in perspective of the twin-cab stacker and mobile work-station.

The invention provides a semi-automated materials handling system for the efficient receipt, storage and issue of materials. The system is designed to supplement and optimize the utilization of the varied and unique stock-replenishment order-picking, metal-cutting and issue capabilities of the specially designed two-man, twin-cab, stacker crane or sideloader. FIG. 1 illustrates in block diagram form of flow chart for mate-

Figure 3:
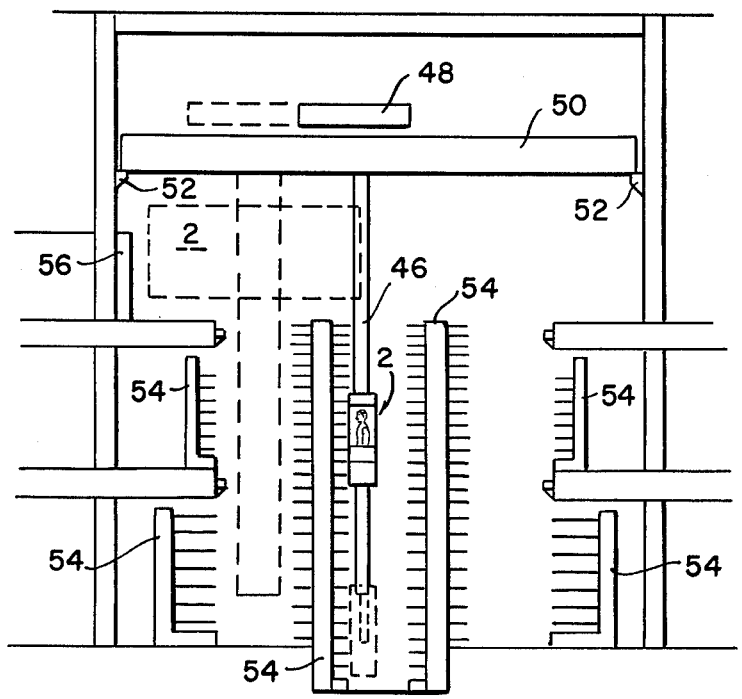
FIG. 3 is a schematic, cross-sectional view of one possible rack arrangement.

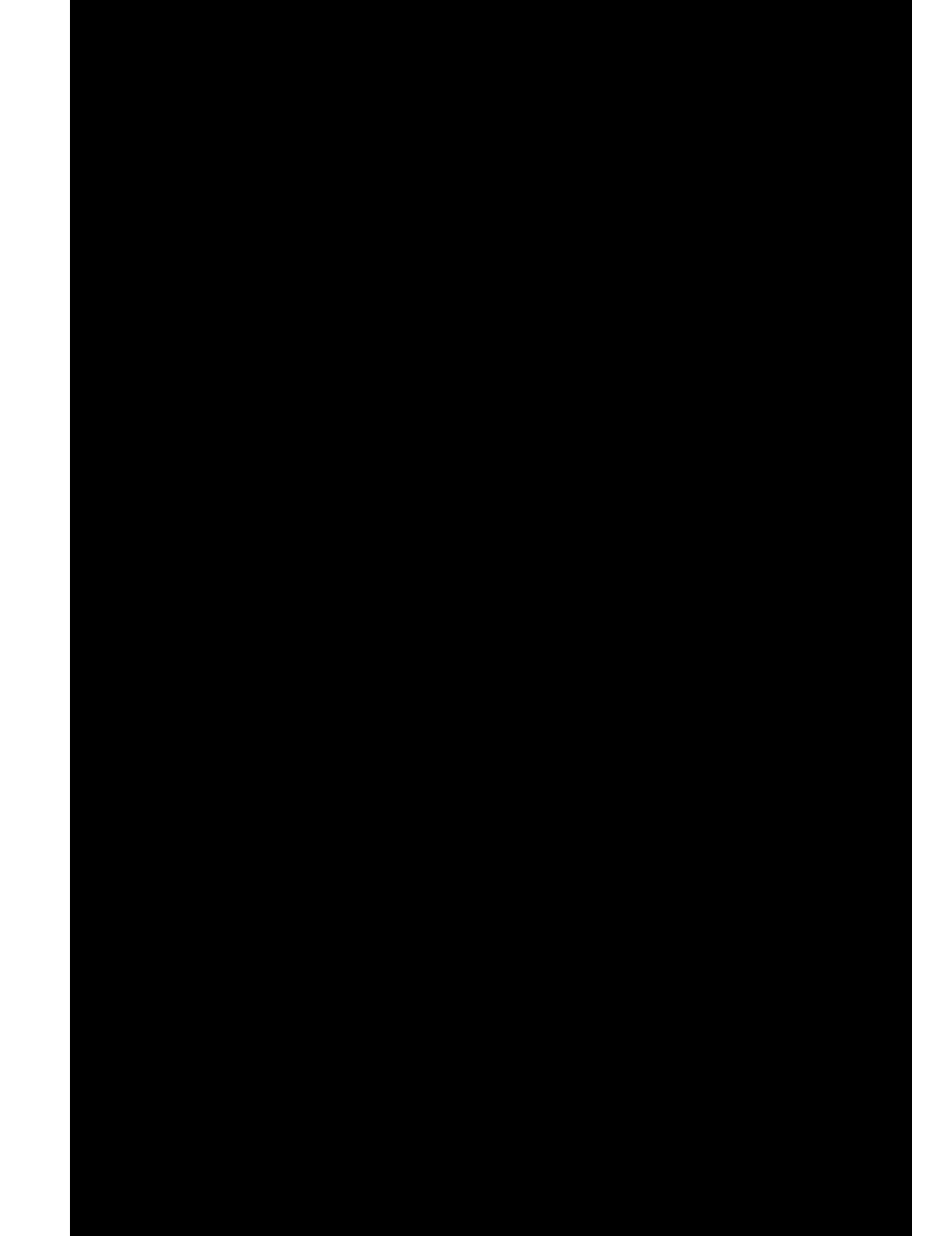

bridge 50 and trolley 48 allow the stacker crane to be positioned for material pick-up. The retail storage area includes both cantilever racks 54 and pigeon-hole racks 56. In addition, storage area may be provided for pallet loads when desirable. The powered turntable enables the twin cab to be rotated 360°. For pick-up of elongated material stored on the cantilever racks 54 the front of the cab faces the racks 54. For pick-up elongated material stored in the pigeon-hole racks 56 the face of the cab is parallel with the elongated passageways defined by the pigeon-hole racks 56 as shown by the broken lines in FIG. 3. Automatic stops similar to those employed in the present modern elevators may be placed on the cantilever or pigeon-hole racks and cooperate with automatic stop 42 on the cab to properly align the twin-cab forks with the rack arms.

Figure 4:
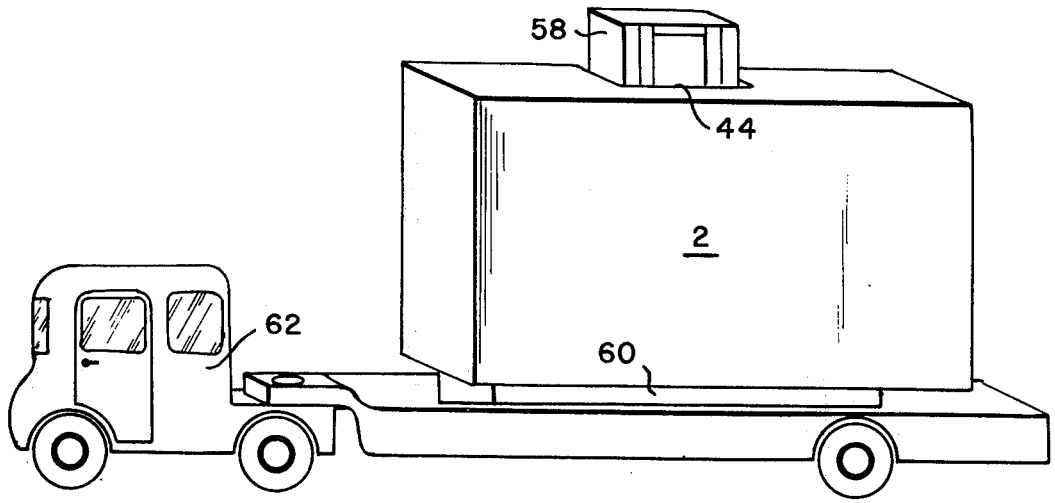
FIG. 4 is a schematic of a twin-cab stacker and mobile work-station in a sideloader configuration.

Alternatively, the twin-cab and mobile work-station 2 may be mounted in the sideloader configuration illustrated diagrammatically in FIG. 4. In FIG. 4 the twin-cab is mounted on a powered turntable 60 which, in turn, is mounted on a powered vehicle 62. A hoist column 58 of known construction is employed to lift the cab. The turntable 60 allows for alignment of the cab with pigeon-holes when desired.

Figure 5:
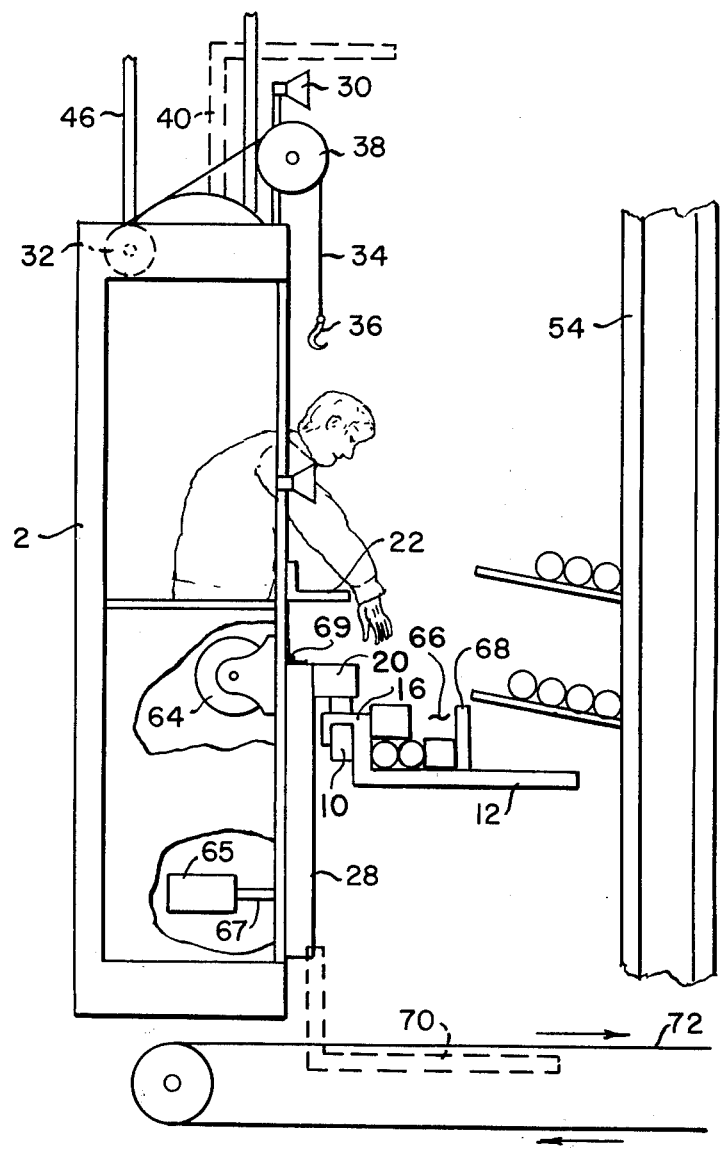
FIG. 5 is a side view of the twin-cab stacker and mobile work-station.

FIG. 5 which is another view of the twin-cab and mobile work-station 2 shows the cab in a typical working position. The electronic stops on the cab and the racks have been aligned. For light materials each operator simply reaches out from his compartment and picks the materials off the racks and puts it in a working pocket 66 as seen in an end view of the cab structure. The pocket is defined by pins 68 which can be placed in the forks 12 and 14, by the upright ends of the forks 12 nearest the cab structure and by the sections of the tines between the fork-ends and the pins. If desired, a longitudinal plate of material can be laid between the upright heels and the pins 84 to form a flooring. Tape dispensers 64 are located in each of the compartments and provide nylon-filament tape to wrap the elongated materials that are to be issued. The tape can also be used to affix residual short lengths of elongated materials to longer lengths in the storage racks to prevent their falling from cantilever or pigeon-hole racks. As illustrated in FIG. 5 the winches 32 may be located inside the twin-cab.

As shown in FIG. 5, the telescoping mast on which the fork carriage is mounted may be affixed by hinges 69 at its top to the housing of the cab. An hydraulic cylinder 65 mounted in the cab has an armature 67 connected to the lower part of the mast 28. Actuation of the cylinder causes the mast and thus the fork carriage to rotate slightly to tilt the forks upward. This tilting ability may help in removing materials from racks and is holding materials on the forks.

When suitable amounts of materials have been accumulated on the forks, the crane is moved to one of the conveyor systems. Each conveyor system has a plurality of parallel conveying devices 72 spaced at predetermined distances so that when the fork carriage is lowered, the forks, when properly aligned, will pass between the parallel conveying devices and the material on the forks will be transferred directly to the conveyor as illustrated by the phantom fork 70 in FIG. 5. This alignment can be accomplished automatically using retro-reflectors as described above.

Figure 6:
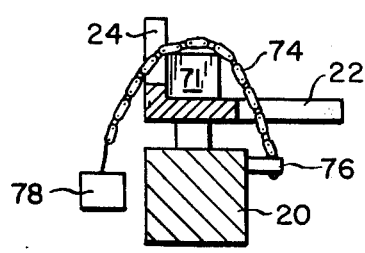
FIG. 6 is a cross-sectional view of the support device employed in the invention.

FIG. 6 is a cross-section of the ledge-fence 22 taken at one of the slots 24. Material 71 to be cut is placed on the ledge-fence 22 which has a graduated scale for measuring the proper amount of material. A chain 74, having a stud 76 thereon, is placed over the material and the stud 76 is placed in the slot in the horizontal portion of the ledge-fence 22. An hydraulic or pneumatic motor 78, toggle clamp or other suitable device is employed to tighten the chain 74 around the material to be cut. Another such chain is located at the other slot 24. The stud 76 is too large to pass through the slot 24 in the horizontal portion of the ledge-fence 22.

Figure 7:
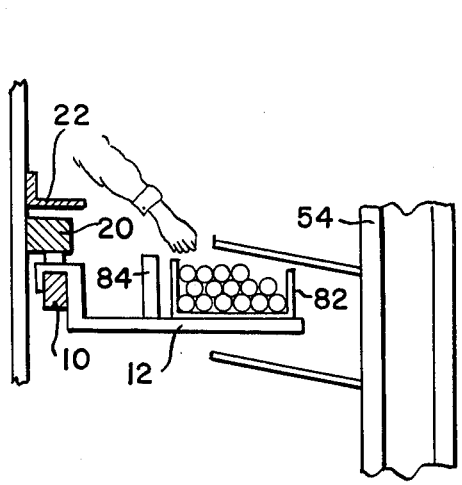
FIGS. 7 and 8 illustrate two methods of removing materials from the racks and onto the forks.
Figure 8:
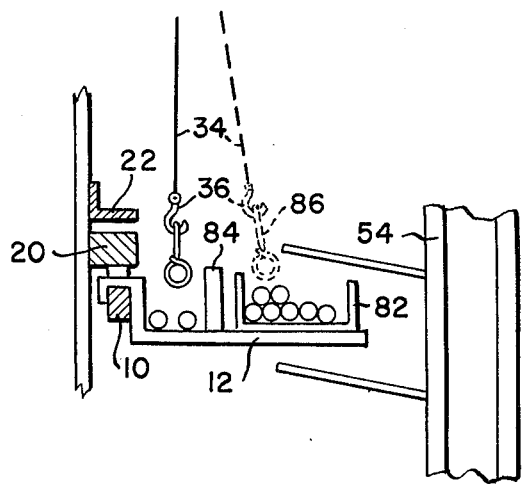

FIGS. 7 and 8 illustrate how the stacker crane can be employed to lift materials that must be stored in pans 82. Pans are employed for material that lacks suitable rigidity or is round. Initially the forks are aligned with the cantilever rack 54. After alignment the forks are moved under the pan 82 to be lifted. The mast 28 on the cab is then activated to lift the forks 12 and the pan 82 from the rack. The forks can then be moved back from the racks 54 for manual lifting of materials by the operators as illustrated in FIG. 7, or for heavier material, the winch cables 34 and hooks 36 can be employed with a choker hitch 86 to lift the material from the pan 82 and place it in the pocket on the forks.

It should further be noted that various other automatic as well as mechanical stops can be positioned along the bridge 50, hoist 46 and parallel tracks 52 to assist with alignment of the twin cab. Moreover, additional spotlights and warning lights may be located on the cab. Although the system has special utility in a metal-storage warehouse, it could easily be employed to handle various other materials and loads.

Obviously, many modifications and variations of the present invention are possible in light of the above teachings. It is therefore to be understood that, within the scope of the appended claims, the invention may be practiced otherwise than as specifically described.

What is claimed is:
1. A mobile work station comprising:
   a movable trolley;
   a vertical column movably mounted on said trolley;
   a housing structure selectively movable vertically along said column, said housing structure including at least one compartment capable of supporting a person therein;
   a ledge-fence having a horizontal material supporting surface and a vertical surface forming a right angle therewith;
   means mounting said ledge-fence directly on said housing structure such that material supporting thereon will be within the normal reach of a person standing within said compartment;
   means for holding and retaining material on said ledge-fence;
   a vertical mast pivotally mounted on said housing structure below said ledge-fence;
   means for pivoting said mast;
   fork carriage means mounted on said mast for vertical movement thereon;
   a winch;
   hoist line means connected to said winch for attaching to material to be lifted; and
   means mounting said winch and hoist line means on said housing structure on an upper surface thereof.
2. A cab-stacker apparatus as in claim 1, wherein:
   said fork carriage having at least two tines thereon, each tine having an upright heel and an upright pin mounted thereon and spaced from said heel to form a working pocket as seen in an end view.
3. A cab-stacker apparatus as in claim 1, wherein said housing structure has two compartments, and said apparatus has two winches with a line for each winch, each winch being associated with a different one of said compartments.

* * * * *